US007433869B2

(12) United States Patent
Gollapudi

(10) Patent No.: US 7,433,869 B2
(45) Date of Patent: Oct. 7, 2008

(54) METHOD AND APPARATUS FOR DOCUMENT CLUSTERING AND DOCUMENT SKETCHING

(75) Inventor: Sreenivas Gollapudi, Cupertino, CA (US)

(73) Assignee: Ebrary, Inc., Palo Alto, CA (US)

( * ) Notice: Subject to any disclaimer, the term of this patent is extended or adjusted under 35 U.S.C. 154(b) by 0 days.

(21) Appl. No.: 11/427,781

(22) Filed: Jun. 29, 2006

(65) Prior Publication Data

US 2007/0005589 A1 Jan. 4, 2007

(51) Int. Cl.
*G06F 17/30* (2006.01)

(52) U.S. Cl. .............................. 707/5; 707/3; 707/101; 707/102

(58) Field of Classification Search .................. 707/5, 707/3, 6, 101, 102, 103, 104.1
See application file for complete search history.

(56) References Cited

U.S. PATENT DOCUMENTS

| 5,237,157 | A | 8/1993 | Kaplan |
| 5,247,575 | A | 9/1993 | Sprague et al. |
| 5,532,920 | A | 7/1996 | Hatrick et al. |
| 5,546,528 | A | 8/1996 | Johnson |
| 5,619,247 | A | 4/1997 | Russo |
| 5,625,711 | A | 4/1997 | Nicholson |
| 5,643,064 | A | 7/1997 | Grinderslev |
| 5,680,479 | A | 10/1997 | Wang et al. |
| 5,729,637 | A | 3/1998 | Nicholson |
| 5,737,599 | A | 4/1998 | Rowe |
| 5,781,785 | A | 7/1998 | Rowe |

(Continued)

FOREIGN PATENT DOCUMENTS

EP 0881591 12/1998

(Continued)

OTHER PUBLICATIONS

Figa, E., et al., "Lexical Inference Mechanisms for Text Understanding and Classification," 2003, Proceedings of the 66th ASIST Annual Meeting, Humanizing Information Technology: From Ideas' to Bits and Back, ASIST 2003, Information Today, Inc., pp. 165-173, Medford, NJ, USA.

(Continued)

*Primary Examiner*—Shahid Al Alam
*Assistant Examiner*—Jason L Alvesteffer
(74) *Attorney, Agent, or Firm*—Michael A. Glenn; Glenn Patent Group

(57) ABSTRACT

A first embodiment of the invention provides a system that automatically classifies documents in a collection into clusters based on the similarities between documents, that automatically classifies new documents into the right clusters, and that may change the number or parameters of clusters under various circumstances. A second embodiment of the invention provides a technique for comparing two documents, in which a fingerprint or sketch of each document is computed. In particular, this embodiment of the invention uses a specific algorithm to compute the document's fingerprint, One embodiment uses a sentence in the document as a logical delimiter or window from which significant words are extracted and, thereafter, a hash is computed of all pair-wise permutations. Words are extracted based on their weight in the document, which can be computed using measures such as term frequency and the inverse document frequency.

12 Claims, 5 Drawing Sheets

U.S. PATENT DOCUMENTS

| | | | |
|---|---|---|---|
| 5,819,301 A | 10/1998 | Rowe | |
| 5,832,530 A | 11/1998 | Paknad | |
| 5,848,184 A | 12/1998 | Taylor et al. | |
| 5,860,074 A | 1/1999 | Rowe | |
| 5,930,813 A | 7/1999 | Padgeett | |
| 5,991,780 A | 11/1999 | Rivette et al. | |
| 5,999,649 A | 12/1999 | Nicholson | |
| 6,041,316 A | 3/2000 | Allen | |
| 6,049,339 A | 4/2000 | Schiller | |
| 6,119,124 A * | 9/2000 | Broder et al. | 707/103 R |
| 6,185,684 B1 | 2/2001 | Pravetz | |
| 6,282,653 B1 | 8/2001 | Berstis et al. | |
| 6,327,600 B1 | 12/2001 | Satoh et al. | |
| 6,345,279 B1 | 2/2002 | Li | |
| 6,356,936 B1 | 3/2002 | Donoho | |
| 6,385,350 B1 | 5/2002 | Nicholson | |
| 6,389,541 B1 | 5/2002 | Patterson | |
| 6,446,068 B1 * | 9/2002 | Kortge | 707/6 |
| 6,516,337 B1 | 2/2003 | Tripp | |
| 6,606,613 B1 | 8/2003 | Altschuler et al. | |
| 6,629,097 B1 | 9/2003 | Keith | |
| 6,732,090 B2 | 5/2004 | Shanahan | |
| 6,920,610 B1 | 7/2005 | Lawton et al. | |
| 6,988,124 B2 * | 1/2006 | Douceur et al. | 709/203 |
| 2002/0138528 A1 * | 9/2002 | Gong et al. | 707/530 |
| 2003/0033288 A1 | 2/2003 | Shanahan | |
| 2003/0037094 A1 | 2/2003 | Douceur et al. | |
| 2003/0037181 A1 | 2/2003 | Freed | |
| 2003/0061200 A1 | 3/2003 | Hubert | |
| 2003/0185448 A1 | 10/2003 | Seeger et al. | |
| 2004/0030680 A1 * | 2/2004 | Veit | 707/3 |
| 2004/0133544 A1 | 7/2004 | Klessig | |
| 2004/0133545 A1 | 7/2004 | Klessig | |
| 2004/0133588 A1 | 7/2004 | Klessig | |
| 2004/0133589 A1 | 7/2004 | Klessig | |
| 2004/0205448 A1 | 10/2004 | Grefenstette | |
| 2005/0022114 A1 | 1/2005 | Shanahan | |

FOREIGN PATENT DOCUMENTS

| | | |
|---|---|---|
| EP | 0881592 | 12/1998 |
| EP | 1284461 A1 | 2/2003 |
| EP | 0881591(B1) | 9/2003 |
| JP | 2001175807 | 6/2001 |
| WO | WO 96/27155 | 9/1996 |
| WO | WO 98/42098 | 9/1998 |
| WO | WO 99/05618 | 4/1999 |
| WO | WO 99/39286 | 5/1999 |
| WO | WO 01/20596 A1 | 3/2001 |
| WO | WO 01/57711 A1 | 9/2001 |
| WO | WO 02/41170 A2 | 5/2002 |
| WO | WO 2005/062192 A1 | 7/2005 |

OTHER PUBLICATIONS

Embley, D.W., et al., "Conceptual-Model-Based Data Extraction from Multiple-Record Web Pages," Nov. 1999, Data & Knowledge Engineering, vol. 31, No. 3, pp. 227-251, Elsevier, Netherlands.

Embley, D.W., et al., "A Conceptual-Modeling Approach to Extracting Data from the Web," 1998,. Conceptual Modeling—ER'98, 17th International Conference on Conceptual Modeling, Proceedings pp. 78-91, Springer-Verlag, Berlin, Germany.

Bartal, "Probabilistic Approximation of Metric Spaces and Its Algorithmic Applications," 1996, In: FOCS Proceedings of the 37th Annual Symposium on Foundations of Computer Science. Washington DC, IEEE, Abstract, pp. 2-3, ISSN 0272-5428.

Zhang, et al., "Birch: An Efficient Data Clustering Method for Very Large Databases," 1996, In: ACM Sigmod Record, Proceedings of the 1996 ACM SIGMOD International Conference on Management of Data, New York: ACM Press, vol. 25, Issue 2, pp. 103-114, ISSN 0163-5808.

* cited by examiner

*Hierarchical Clusters*

*Taxonomy*

METHOD AND APPARATUS FOR DOCUMENT CLUSTERING AND DOCUMENT SKETCHING

BACKGROUND OF THE INVENTION

1. Technical Field

The invention relates to automatic document classification. More particularly, the invention relates to a method and apparatus for automatic document classification using either document clustering and document sketch techniques.

2. Description of the Prior Art

Typically, document similarities are measured based on the content overlap between the documents. Such approaches do not permit efficient similarity computations. Thus, it would be advantageous to provide an approach that performed such measurements in a computationally efficient manner.

Documents come in varying sizes and formats. The large size and many formats of the documents makes the process of performing any computations on them very inefficient. Comparing two documents is an oft performed computation on documents. Therefore, it would be useful to compute a fingerprint or a sketch of a document that satisfies at least the following requirements:

- It is unique in the document space. Only the same documents share the same sketch.
- The sketch is small, thereby allowing efficient computations such as similarity and containment.
- Its computation is efficient.
- It can be efficiently computed on a collection of documents (or sketches).
- The sketch admits partial matches between documents. For example, a 60% similarity between two sketches implies 60% similarity between the underlying documents.

There are known algorithms that compute document fingerprints. Broder's implementation (see Andrei Z. Broder, *Some applications of Rabin's fingerprinting method*, In Renato Capocelli, Alfredo De Santis, and Ugo Vaccaro, editors, *Sequences II: Methods in Communications, Security, and Computer Science*, pages 143-152. Springer-Verlag, 1993) based on document shingles is a widely used algorithm. This algorithm is very effective when computing near similarity or total containment of documents. In the case of comparing documents where documents can overlap with one another to varying degrees, Broder's algorithm is not very effective. It is necessary to compute similarities of varying degrees. To this end, it would be desirable to provide a method to compute document sketches that allows for effective and efficient similarity computations among other requirements.

SUMMARY OF THE INVENTION

A first embodiment of the invention provides a system that automatically classifies documents in a collection into clusters based on the similarities between documents, that automatically classifies new documents into the right clusters, and that may change the number or parameters of clusters under various circumstances.

A second embodiment of the invention provides a technique for comparing two documents, in which a fingerprint or sketch of each document is computed. In particular, this embodiment of the invention uses a specific algorithm to compute each document's fingerprint. One embodiment uses a sentence in the document as a logical delimiter or window from which significant words are extracted and, thereafter, a hash is computed of all pair-wise permutations of the significant words. The significant words are extracted based on their weight in the document, which can be computed using measures such as term frequency and inverse document frequency. This approach is resistant to variations in text flow due to insertions of text in the middle of the document.

DETAILED DESCRIPTION OF THE INVENTION

Figure 1:
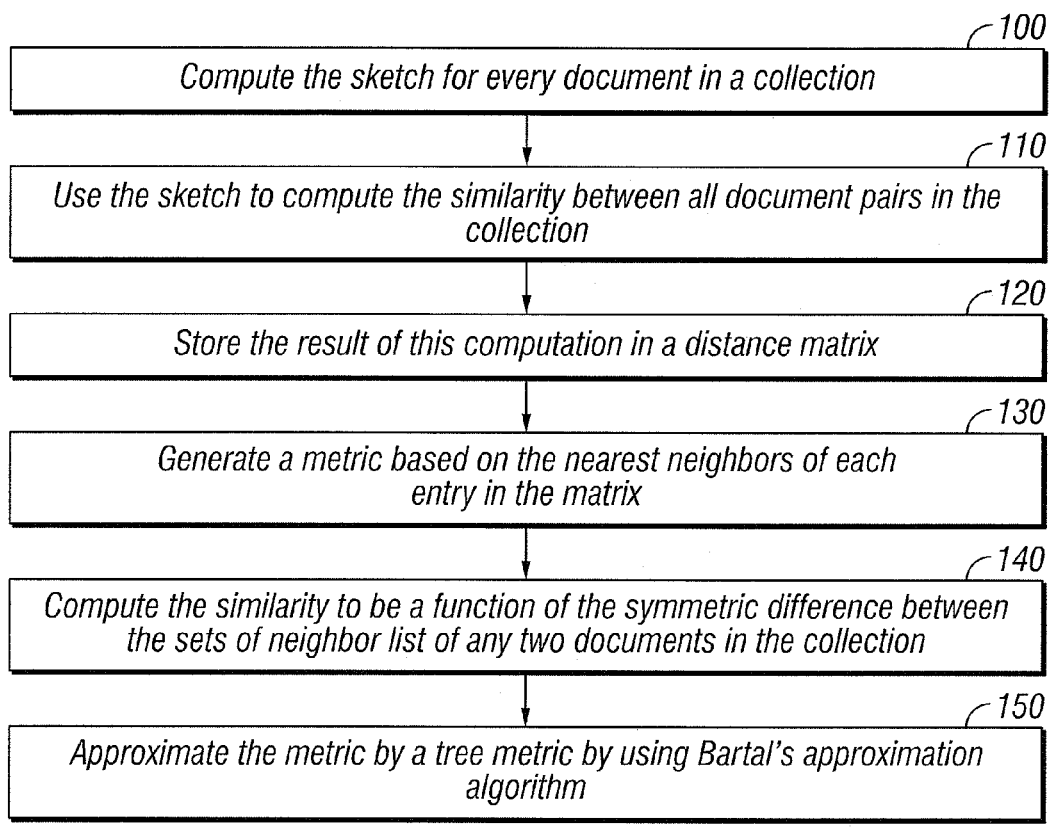
FIG. 1 is a flow diagram showing a document clustering algorithm according to some embodiments of the present invention.

A first embodiment of the invention provides a system that automatically classifies documents in a collection into clusters based on the similarities between documents, that automatically classifies new documents into the right clusters, and that may change the number or parameters of clusters under various circumstances. A second embodiment of the invention provides a technique for comparing two documents, in which a fingerprint or sketch of each document is computed. In particular, this embodiment of the invention uses a specific algorithm to compute the document's fingerprint. One embodiment uses a sentence in the document as a logical delimiter or window from which significant words are extracted and, thereafter, a hash is computed of all pair-wise permutations. Words are extracted based on their weight in the document, which can be computed using measures such as term frequency and the inverse document frequency.

Document Clustering

A first embodiment of the invention is related to an automatic classification system which allows for:

(1) a collection of documents to be automatically classified into clusters based on the similarities between the documents, and (2) new documents to be automatically classified into clusters based on similarities between new and/or existing documents, and/or based on existing clusters, and (3) new clusters to be added, or existing clusters to be combined or modified, based on automatic or manual processes.

Typically, document similarities are measured based on the content overlap between the documents. For efficient similarity computations, a preferred embodiment of the invention uses the document sketches instead of the documents. Another measure of choice is the document distance, The document distance, which is inversely related to similarity, is mathematically proven to be a metric. Formally, a metric is a function that assigns a distance to elements in a domain. The inventors have found that the similarity measure is not a metric. The presently preferred embodiment of the invention uses this distance metric as a basis for clustering documents in groups in such a way that the distance between any two documents in a cluster is smaller than the distance between documents across clusters.

An advantage of the clusters thus generated is that they can be organized hierarchically by approximating the distance metric by what is called a tree metric. Such metrics can be effectively computed, with very little loss of information, from the distance metric that exists in the document space. The loss of information is related to how effectively the tree metric approximates the original metric. The approximation is mathematically proved to be within a logarithmic factor of the actual metric. Hierarchically generated metrics then can be used to compute a taxonomy. One way to generate a taxonomy is to use a parameter that sets a threshold on the cohesiveness of a cluster. The cohesiveness of a cluster can be defined as the largest distance between any two documents in the cluster, This distance is sometimes referred to as the diameter of the cluster. Based on a cohesiveness factor (loosely defined as the average distance between any two points in a cluster), nodes in the tree can be merged to form bigger clusters with larger diameters, as long as the cohesiveness threshold is not violated.

FIG. 1 is a flow diagram showing a document clustering algorithm according to the invention. The following is an outline of a presently preferred algorithm for computing the hierarchical clustering in the document space.

Compute the sketch for every document in a collection (100). The sketch is then used to compute the similarity between all document pairs in the collection (110). The result of this computation is stored in a distance matrix (120). The distance matrix is a sparse matrix. A sparse matrix has many zero entries Thus, the number of non-zero entries in a sparse matrix is much smaller than the number of zeroes in the matrix. Data structures/formats are used to store and manipulate such matrices efficiently.

Then generate a metric based on the nearest neighbors of each entry in the matrix (130). The number of neighbors is a parameter that can be modified by the user. The similarity is then computed (140) to be a function of the symmetric difference between the sets of neighbors of any two documents in the collection. The symmetric difference of two sets A and B is:

$(A-B) \cup (B-A)$

This is chosen over direct comparison of document sketches because, by including a larger document set that does not necessarily use the same words or phrases to describe similar concepts, it is richer in comparing content.

The metric is then approximated by a tree metric (150) by using Bartal's approximation algorithm (see Y. Bartal, *Probabilistic Approximations of Metric Spaces and its Algorithmic Applications*, IEEE Conference on Foundations of Computer Science, 1996). The size of each cluster and the depth/width of the hierarchical clusters can be controlled by the number of nearest neighbors included in the metric computation.

Document Sketch

As discussed above, it would be desirable to provide a method to compute document sketches that allows for effective and efficient similarity computations among other requirements, The following discussion concerns a presently preferred embodiment for computing the sketch for the document.

Figure 2:
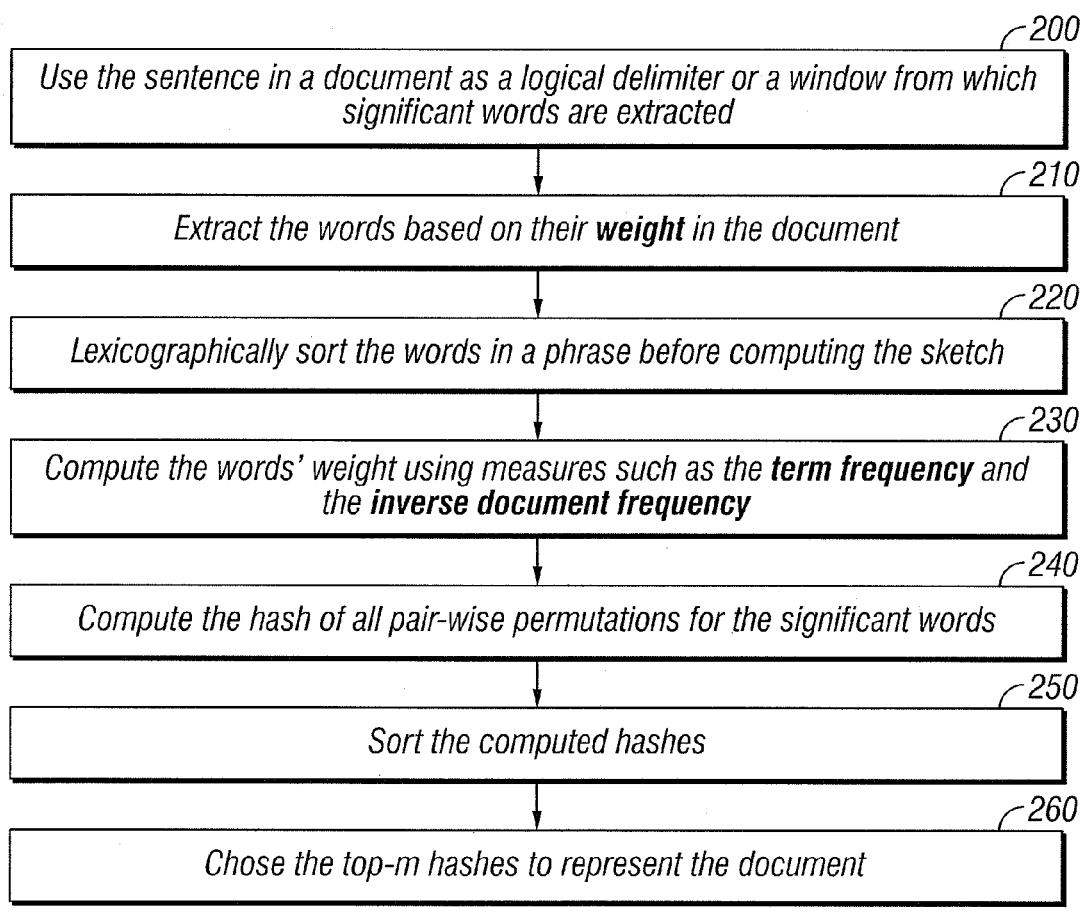
FIG. 2 is a flow diagram showing a document sketch algorithm according to some embodiments of the present invention.

A basic fingerprinting method involves sampling content, sometimes randomly, from a document and then computing its signature, usually via a hash function. Thus, a sketch consists of a set of signatures depending on the number of samples chosen from a document. An example of a signature is a number $\{i \square \{1, \ldots, 2^{51}\}$, where l is the number of bits used to represent the number. Broder's algorithm (supra) uses word shingles, which essentially is a moving window over the characters in the document. The words in the window are hashed before the window is advanced by one character and its hash computed. In the end, the hashes are sorted and the top-k hashes are chosen to represent the document. It is especially important to choose the hash functions in such a way as to minimize any collisions between the resulting sketches FIG. 2 is a flow diagram showing a document sketch algorithm according to the invention. In a presently preferred embodiment of the invention, the following algorithm is use to compute the document's fingerprint:

Unlike the existing fingerprinting algorithms that use word shingling to compute a sketch, the presently preferred embodiment of the invention uses the sentence in a document as a logical delimiter or window from which significant words are extracted (200) and the hash of all their pair-wise permutations is computed (240). The words are extracted based on their weight in the document (210) which can be computed (230) using measures such as the term frequency and the inverse document frequency. For example, if the top three words in a sentence are ebrary, document, and DCP, the invention computes the hashes for the phrases "document ebrary," "DCP ebrary," and "DCP document." The invention lexicographically sorts the words in a phrase before computing the sketch (220). This way it is only necessary to compute the hash of three phrases instead of six. By choosing a sentence as a logical window, the invention implicitly considers the semantics of each word and its relationship to other words in the sentence. Furthermore, by considering the top-k words and the resulting phrases, the invention captures the content of the sentence effectively.

The computed hashes are then sorted (250) and the top-m hashes are chosen to represent the document (260). Typical values of m are 256 to 512 for large documents (>1M).

Applications of this embodiment of the invention include how such sketches are transported efficiently, e.g. using Bloom filters, compute the sketch of a hierarchy or a taxonomy given the sketches of the documents in the taxonomy. Maintaining the sketch for a taxonomy or a collection can help in developing efficient algorithms to deal with distributed/remote collections.

Some Applications of the Invention

Some of the applications of the above inventions include but are not limited to:

Selection based associative search of documents. Unlike traditional search wherein a user types a query, composed of a small number of words, a sketch based approach enables the user to select a section of a document and then look for documents containing similar information.

Automatic taxonomy generation and clustering of documents. The tree metric approach has the advantage of maintaining the original distances between documents while at the same time organizing the documents in a hierarchy. Secondly, the tree structure allows for efficient extraction of taxonomies from the tree metric. Automatic creation of taxonomies helps in overcoming bottlenecks created by categorization of a large collection of documents. One can use such a method for on-line classification wherein documents arrive into the system at different times and they need to be indexed in an existing taxonomy. Note that each node in the taxonomy could be considered as a cluster. This is different from the first case in which a taxonomy is created from the given document collection.

The compact representation of a sketch is useful in supporting a number of operations on documents and collections. One operation is computing similarities for associative search. Another use is in a distributed environment for collaboratively shared documents. A sketch provides a method for efficient inter-repository distribution, communication, and retrieval of information across networks wherein the whole document or a collection need not be transported or queried against. Instead the sketch substitutes for a document in all the supported computations. Furthermore an efficient associative search provides for an enhanced turn-away feature by offering similar books when the requested document is not available.

Dealing with sketches instead of documents allows a system to support efficient navigation and traversal of documents in a collection. This is based on a notion of 'nextness' in the navigation space which is analogous to 'closeness' in the metric space in which the documents exist. For example, a traversal order of a document set given a query document can be constructed from the nearest neighbors of the query document in the metric space. This interface can be extended to a cluster or group of documents by using a tree metric wherein the user can traverse a set of document clusters based on their closeness in the underlying metric space.

Figure 3:
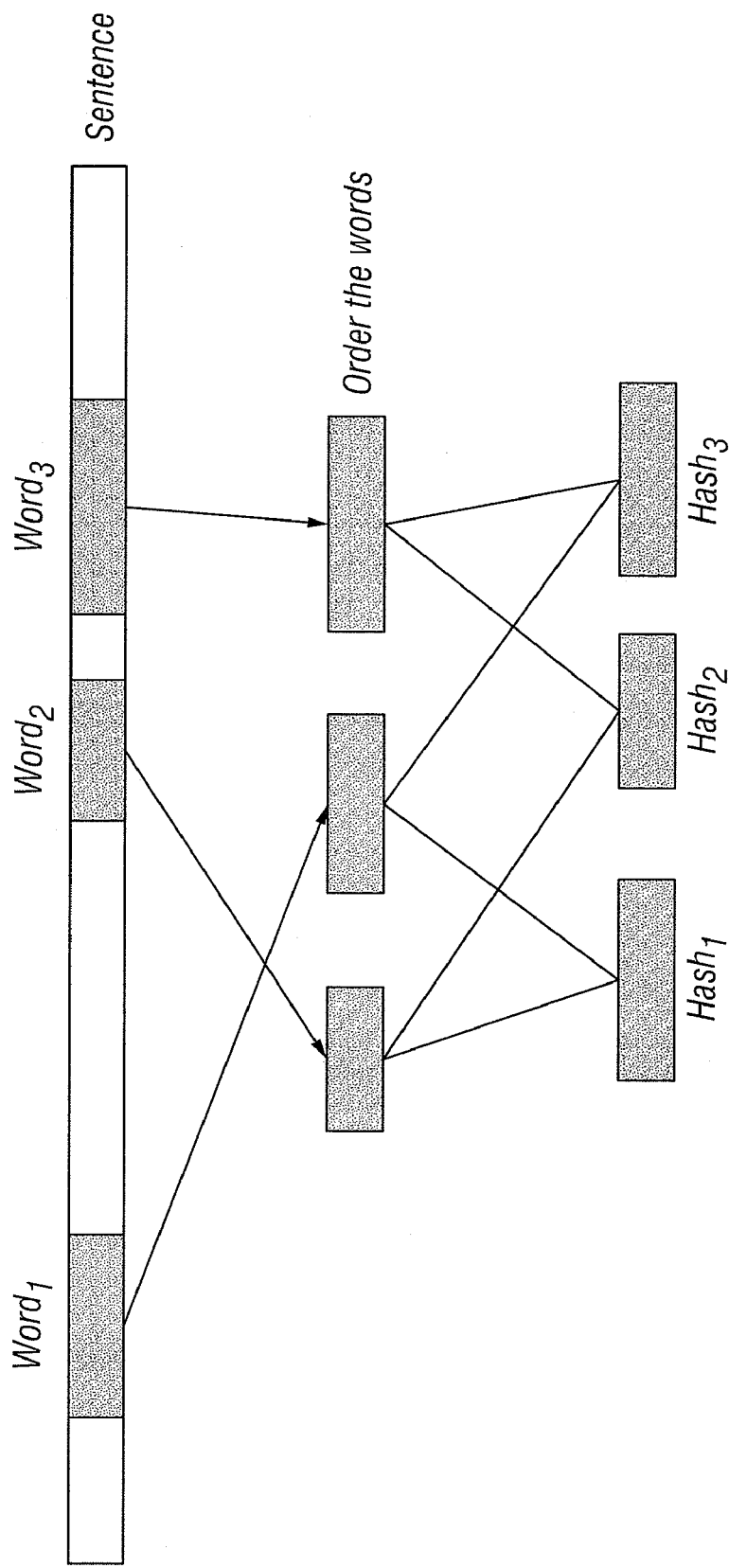
FIG. 3 is a block diagram illustrating computing a sketch of a sentence, according to some embodiments of the present invention.
Figure 4:
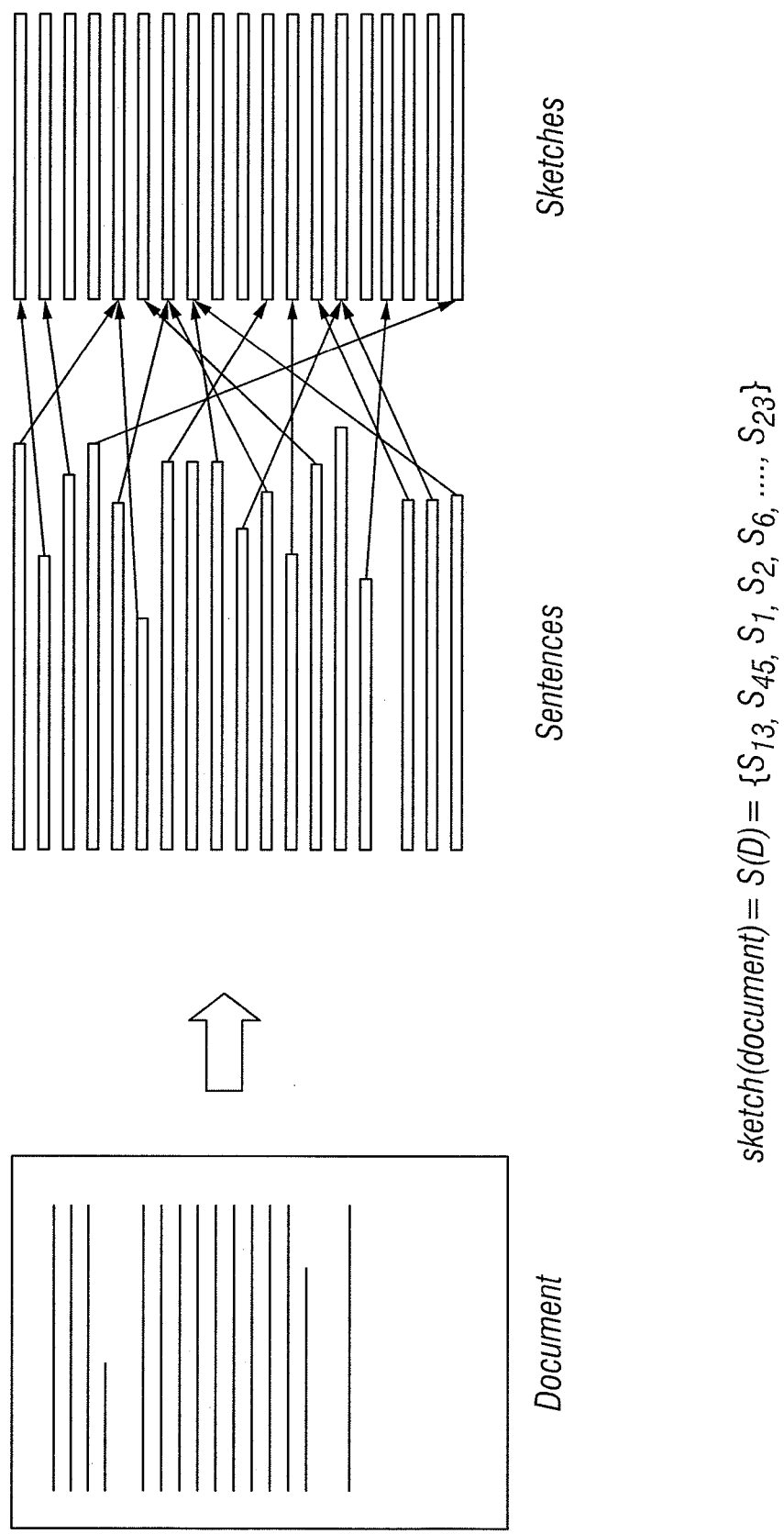
FIG. 4 is a diagram illustrating computing the sketch of a document, according to some embodiments of the present invention.
Figure 5:
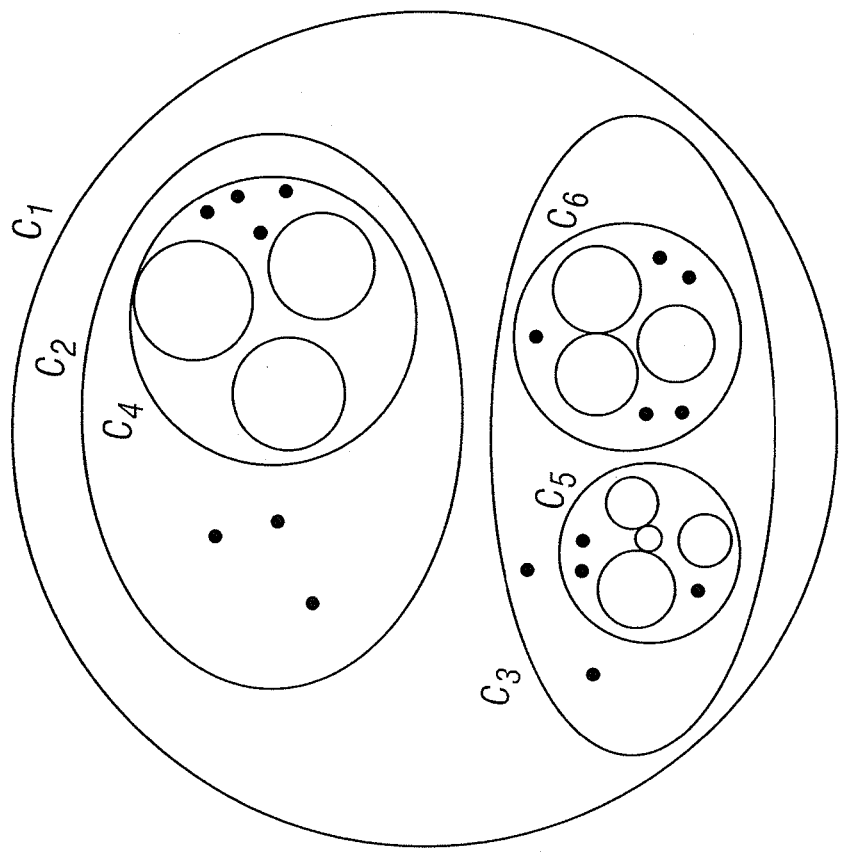
FIG. 5 is a diagram illustrating mapping from the cluster space to a taxonomy, according to some embodiments of the present invention.
Figure 5:
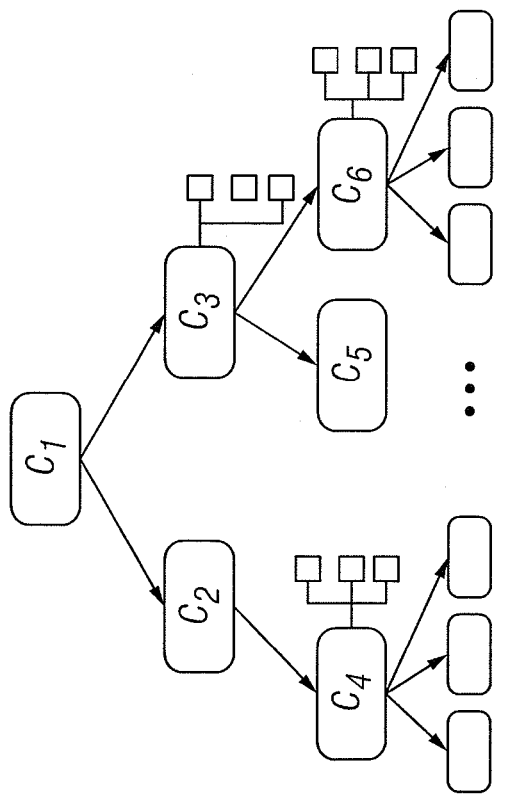

FIGS. 3-5 illustrate certain functionality according to some embodiments of the present invention. More specifically, FIG. 3 illustrates computing a sketch of a sentence, according to some embodiments of the present invention, FIG. 4 illustrates computing the sketch of a document, according to some embodiments of the present invention, and FIG. 5 illustrates mapping from the cluster space to a taxonomy, according to some embodiments of the present invention.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for computing the sketch for a document, comprising the steps of:
using a sentence in a document as a logical delimiter or window from which significant words are extracted based upon semantics of each word in the sentence and each word's relationship to other words in the sentence;
computing a weight for said extracted words;
extracting the top-k of said words based on their weight in the document, wherein k represents a numerical value;
lexicographically sorting words in a phrase to capture content of the sentence before computing a sketch;
computing a hash of all pair-wise permutations for said significant words;
sorting said computed hashes; and
choosing the top-m hashes to represent the document, wherein m represents a numerical value.

2. The method of claim 1, wherein values of m are 256 to 512 for large documents (>1M).

3. The method of claim 1, wherein weight is computed using measures comprising any of term frequency and inverse document frequency.

4. The method of claim 1, further comprising the step of:
transporting sketches using Bloom filters.

5. The method of claim 1, further comprising the step of:
computing a sketch of a hierarchy or a taxonomy given the sketches of the documents in the taxonomy.

6. The method of claim 1, further comprising the step of:
performing a selection based associative search of documents by allowing an end user to select a portion of a document and then identifying documents containing similar information.

7. The method of claim 1, further comprising the step of:
performing automatic taxonomy generation and clustering of documents using a tree metric approach to maintain original distances between documents while at the same time organizing said documents in a hierarchy.

8. The method of claim 7, further comprising the step of:
performing efficient extraction of taxonomies from said tree metric.

9. The method of claim 1, further comprising the step of:
performing on-line classification, wherein documents arrive at different times and are indexed in an existing taxonomy.

10. The method of claim 1, further comprising the steps of:
providing a compact representation of a sketch; and
computing similarities for associative search.

11. The method of claim 1, further comprising the step of:
in a distributed environment for collaboratively shared documents, using a sketch for efficient inter-repository distribution, communication, and retrieval of information across networks, wherein a whole document or a collection need not be transported or queried against, wherein said sketch substitutes for a document in all supported computations.

12. The method of claim 11, wherein an efficient associative search offers similar documents when a requested document is not available.

* * * * *

UNITED STATES PATENT AND TRADEMARK OFFICE
CERTIFICATE OF CORRECTION

PATENT NO.         : 7,433,869 B2                                     Page 1 of 1
APPLICATION NO. : 11/427781
DATED              : October 7, 2008
INVENTOR(S)        : Sreenivas Gollapudi It is certified that error appears in the above-identified patent and that said Letters Patent is hereby corrected as shown below:

Col. 1 lines 3-4, Insert immediately after the title:
--This application claims priority to U.S. Provisional Application No. 60/695,939, filed on July 01, 2005.--

ON TITLE PAGE, Add:
--Related U.S. Application Data Item (60) Provisional Application No. 60/695,939, filed on July 01, 2005--

Signed and Sealed this

Twenty-third Day of December, 2008

JON W. DUDAS
*Director of the United States Patent and Trademark Office*